A. RYDQUIST.
VENDING MACHINE.
APPLICATION FILED AUG. 20, 1908.

949,914.

Patented Feb. 22, 1910.
9 SHEETS—SHEET 2.

A. RYDQUIST.
VENDING MACHINE.
APPLICATION FILED AUG. 20, 1908.

949,914.

Patented Feb. 22, 1910.
9 SHEETS—SHEET 4.

Witnesses
J. M. Fowler Jr.
A. L. Kitchin

Inventor
Adolph Rydquist
By Mason Fenwick Lawrence
his Attorneys

A. RYDQUIST.
VENDING MACHINE.
APPLICATION FILED AUG. 20, 1908.

949,914.

Patented Feb. 22, 1910.
9 SHEETS—SHEET 8.

Witnesses
Inventor
Adolph Rydquist

A. RYDQUIST.
VENDING MACHINE.
APPLICATION FILED AUG. 20, 1908.

949,914.

Patented Feb. 22, 1910.
9 SHEETS—SHEET 9.

Witnesses
J. M. Fowler Jr.
A. S. Kitchin

Inventor
Adolph Rydquist
By Mason Fenwick Lawrence
his Attorneys

UNITED STATES PATENT OFFICE.

ADOLPH RYDQUIST, OF ROCHESTER, NEW YORK.

VENDING-MACHINE.

949,914.  Specification of Letters Patent.  Patented Feb. 22, 1910.

Application filed August 20, 1908. Serial No. 449,509.

*To all whom it may concern:*

Be it known that I, ADOLPH RYDQUIST, a citizen of the United States, residing at Rochester, in the county of Monroe and State of New York, have invented certain new and useful Improvements in Vending-Machines; and I do hereby declare the following to be a full, clear, and exact description of the invention, such as will enable others skilled in the art to which it appertains to make and use the same.

This invention relates to improvements in vending machines, and particularly to coin controlled vending machines.

One of the objects of the invention is the vending of packages or articles arranged to be fed successively to a discharge chute upon the insertion of a proper sized coin and the operating of the ejecting mechanism that is brought into operative relationship to the chute by the insertion of said coin.

Another object in view is the provision of improved means for vending a plurality of kinds of merchandise in predetermined sizes and in bulk upon the insertion of the proper sized coin and the operation of the proper mechanism.

A still further object of the invention is the provision of improved chutes and receptacles for containing packages of predetermined size and material in bulk to be vended, ejecting mechanism arranged to eject the said packages or merchandise in bulk according to the position of an operating coin that has been passed into said ejecting mechanism, and means for detecting spurious coins and preventing the same from causing said ejecting means to vend any of said material to be vended.

With these and other objects in view the invention comprises certain novel constructions, combinations and arrangement of parts as will be hereinafter more fully described and claimed.

In the accompanying drawings: Fig. 11 is a section through Fig. 10 approximately on line 11—11.

Referring to the drawing by numerals, 1 indicates a housing of any desired kind, preferably arranged so as to give a neat appearance for the various means used in holding and vending the material desired to be sold. The housing 1 is adapted to contain any desired number of frames 2 and 3 that hold the ejecting mechanism and various other associated mechanisms connected therewith. Positioned above the frames 2 and 3 is a door or removable front member 4 preferably provided with a mirror upon which various advertising matter may be placed for advantageously setting forth the merits of the articles desired to be vended or any other desired information.

The frameworks 2 and 3 are adapted to be identical and to contain the same kind of mechanism and may be of any desired number according to the size of housing 1. Positioned in one of these frameworks, as for instance 2, is a plunger 26 adapted to operate an ejector, frame or carriage 20' upon which are pivotally mounted ejecting members 7 and 8. The ejecting members 7 and 8 are adapted to operate independently so that though the plunger rod 26 moves both of the ejecting members only one may operate for dispensing an article if it is so desired.

Figure 1:
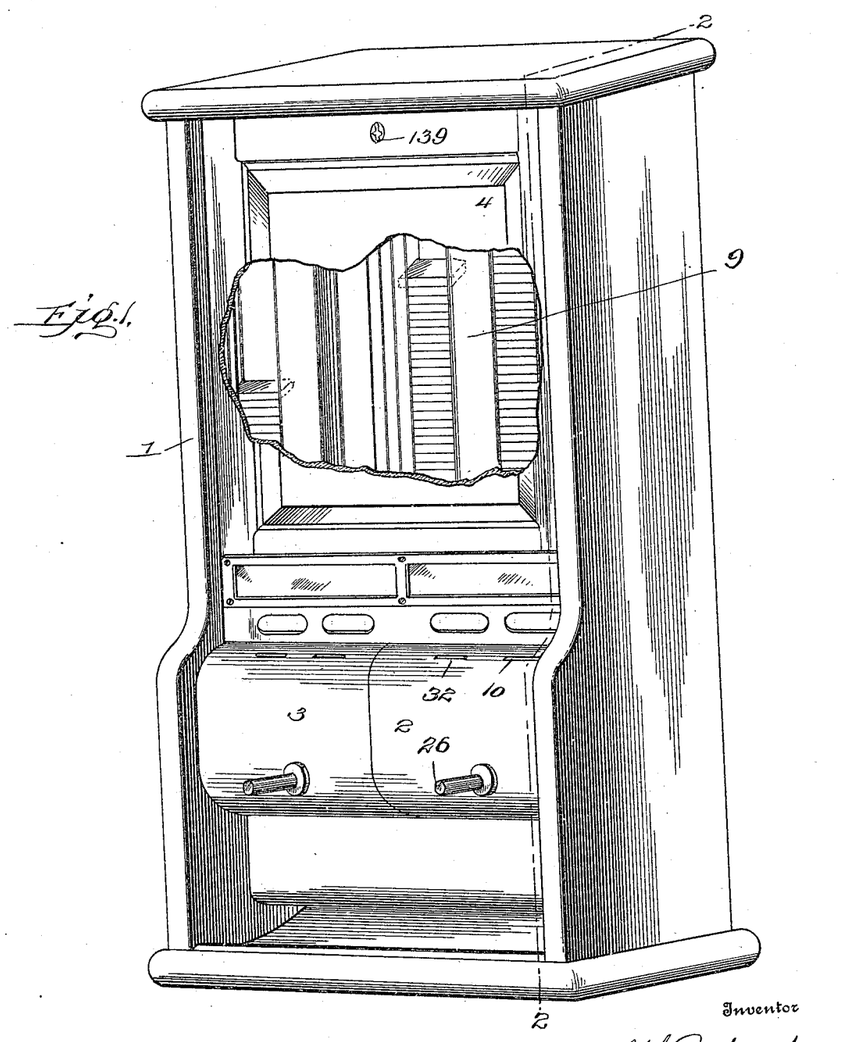
Figure 1 is a perspective view of a complete machine embodying the features of the present invention.
Figure 2:
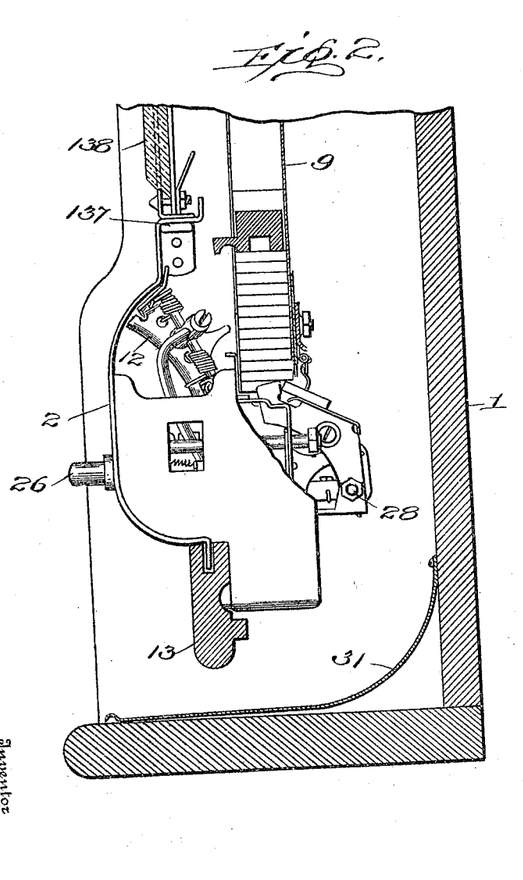
Fig. 2 is a section through Fig. 1 approximately on line 2—2, certain parts being broken away to better disclose the operation.
Figure 4:
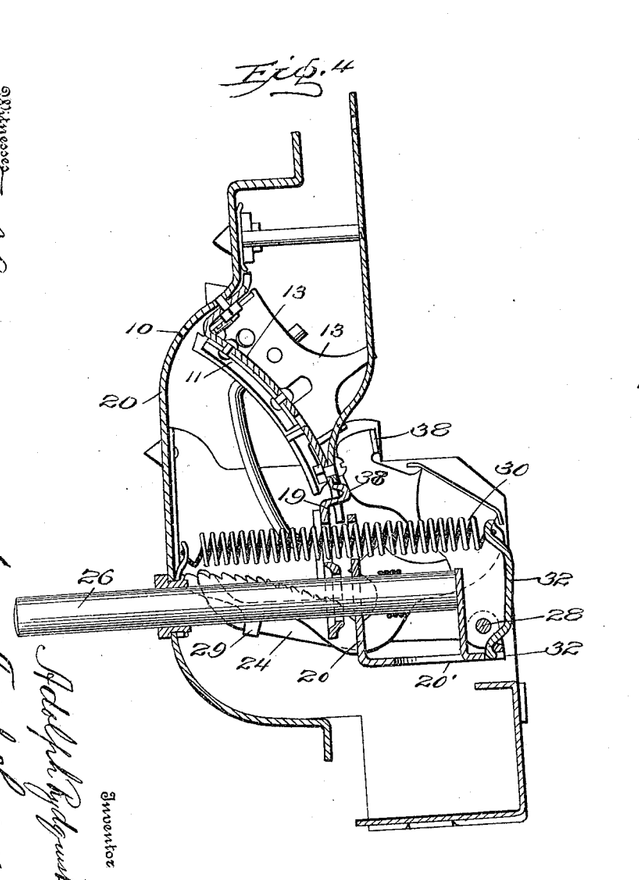
Fig. 4 is a section through Fig. 3 approximately on line 4—4.
Figure 5:
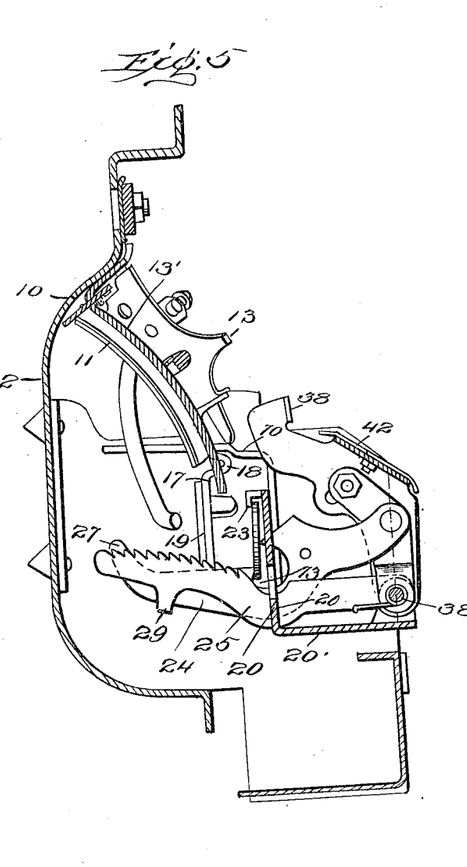
Fig. 5 is a section through Fig. 3 approximately on line 5—5.

When it is desired to vend an article from a tube or magazine 9 a coin of the proper size is inserted into an aperture 10 and the same slides down a slide or guide way formed by guiding plates 11, 12 and 13. Plate 11 is firmly secured to a plate 13' that in turn is rigidly secured to a frame 2. Plates 12 and 13 are pivotally mounted in upturned members 14—14 and 15—15 of plate 13'. The plates 12 and 13 are bent over toward plate 11 and form a guide or support for one side of the coin as the same passes downward. The turned over portions are held properly in position for forming a guide for the coin by the action of springs 16—16. The plates 12 and 13 are adapted to extend from openings 10—10 to substantially near openings 17—17 formed in plate 13'. The plate 13' is offset at 18—18 to form a plate 19. The openings 17—17 are at the point 18—18 and are arranged as a continuation of the guide ways formed by plates 11, 12 and 13 so that as the coins pass down the guide ways the same will pass to openings 17—17 and take a position in front of plate 19. As the coins pass in front of plate 19 they at the same time occupy positions at the rear of plate 20 forming part of the ejecting frame or carriage 20' carrying the ejectors 7 and 8. As one of the coins thus takes a position between plates 19 and 20 it is adapted to rest upon an inclined projection 21 which, together with plates 19 and 20, guides the coin to a position beneath a projection 22, a hook 23, and a releasing arm 24. When the coin is in this position the same is ready to be grasped by releasing arm 24 and hook 23 and at the same time cause ratchet arm 25 to engage the bottom edge of plate 20 so as to prevent a return movement of the ejector carriage 20' until the same has been forced into its extreme outermost position and the coin released and at the same time merchandise has been discharged. After the coin has taken a position between hook 23 and arm 24 plunger 26 is forced inward to the position shown in Fig. 4 which is almost the extreme inward movement. From this position the plunger continues to move inward until the curved up or cam shaped end 27 of releasing arm 24 strikes against plate 19 and forces arm 24 downward upon its pivotal mounting 28. As arm 24 moves downward the same strikes against a bent over or hook shaped member 29 projecting from ratchet arm 25. This will force the teeth of arm 25 out of engagement with plate 19. When hook shaped member 27 has lowered arm 24 the same will free the coin which will then drop to the bottom part of framework 2 and remain therein. At the same time that the coin is thus released ratchet arm 25 is released so that the plunger 26 and carriage 20' may return to their original positions under the action of spring 30. Upon the movement of the carriage 20', the ejecting member 7 or 8 as the case may be that is held elevated by the coin engaged by hook 23 and arm 24 is caused to strike against the lowermost package or article to be vended (Fig. 2) and forced from chute 9 against the back of housing 1. From thence it falls against the deflector 31 from where it may be removed by the purchaser. When a coin is placed in aperture 10 the same is designed to operate ejecting member 8 and when placed in aperture 32 the coin will operate ejecting member 7. When a coin has been placed in aperture 10 the same will hold ejecting member 8 in the position shown in Fig. 2 but will permit ejector member 7 to move downward below chute 9 and then outward. By this construction and arrangement only the ejecting members operated by a coin will force from the respective magazines the packages to be vended, as the ejecting member not operated by a coin will move downward and thus not come in contact with any of the packages in the magazines. In order to accomplish this spring 30 engages a spider 32 which is pivotally mounted at 33 in frame or carriage 20' and has arms 34 and 35 respectively engaging ejectors 7 and 8. Spring 30 is normally under tension, but permits a free reciprocatory movement of frame 20'. As ejecting members 7 and 8 are pivotally mounted upon a shaft 28 the same will be given a tendency at all times to rest against plate 20 or against beads or offsets 18 according to the position of the frame 20', spring 30 acting through spider 32 causing the ejecting members 7 and 8 to act in this manner. When a coin is being held in place by lever 24 and hook 23 the respective ejector 7 or 8 as the case may be will be held in a raised position as clearly seen in Fig. 5 so that extension 38 will strike the articles to be vended and force the same from their particular magazine. In this manner the extension 38 which strikes the article and forces the same from its respective magazine is held elevated until it has passed entirely through the magazine and then it is released and permitted to be lowered by spring 30 acting through spider 32. This releasing and lowering of the ejector and its extension 38 is caused by the hook shaped or cam end 27 of lever 24 striking against the lower edge of plate 19. As the hook shaped or cam portion 27 strikes against the lower edge of plate 19 lever 24 is lowered and in its downward movement comes in contact with extension or bent over portion 29 and forces the same, together with arm 25, downward and out of engagement with plate 19. This will not only permit the ejector and extension 38 to be lowered but will also permit the entire ejector carrying frame 20' to return to its original position as shown in Fig. 4, ready for another operation.

The ejecting members proper are formed preferably from a single piece of metal bent so as to have a substantially U shaped construction at the lower part, and an arm at the upper part upon which is mounted extension 38. The U shaped part of the ejector is formed from legs 39 and 40 through which is passed shaft 28 for forming a journal bearing therefor. These legs 39 and 40 are connected by a plate 41 at their upper ends to which may be secured a plate 42 that forms a shelf against which the article forced from the magazine rests as the same is forced from the respective magazine. The leg 40 extends upward and is formed into an arm 43 that has a bearing surface 44 that is adapted to rest against one of the beads 18. The arm 43 has an extension 38 formed thereon that is adapted to engage the article to be vended and force the same from its magazine. Formed in leg 40 is a slot 45 through which a retaining bolt 46 is passed for engaging an adjusting arm or lever 47. The arm or lever 47 is pivotally mounted upon shaft 28 and has pivotally connected therewith lever 24. Slot 45 is preferably struck on the arc of a circle with the center at the center of shaft 28 so that by adjusting bolt 46 in the slot arm 47 may adjust the position of lever 24 so as to grip any desired size coin as to properly operate in connection therewith.

In order to cause the ratchet arm 25 to engage plate 19 a spring 48 is mounted upon shaft 18 between members 39 and 40 and has one end of the spring engaging leg 39 and the other end engaging the ratchet lever. This will give the ratchet arm a continuous tendency to move upward upon its pivotal point which is shaft 28. A lug 49 is formed on arm 25 and is adapted to engage or strike against leg 40 for preventing the arm 25 from moving beyond a predetermined distance upward. The ejecting members 7 and 8 are mounted upon a single shaft 28 that is supported upon ears 50 and 51. There is also a pair of ears 52 and 53 pressed out from the frame 20' for holding the respective ejecting members 7 and 8 in position and in loose contact with the ears 50 and 51.

All of the ejecting members are made preferably alike in their various detailed construction and arrangement, and the same are arranged to operate in pairs. However, the ejectors may be arranged so as to be right and left, that is, for instance leg 40 of one ejecting member may bear against lug 50, and another leg corresponding to leg 40 in the other ejecting member bear against ear 51 so that when arranged in this manner the extension 38 engaging the respective packages in the magazines will be on the outside.

For the ejecting members 7 and 8 are provided slots 10 and 32 that permit the insertion of a coin in the runways or slides formed by members 12 and 13, and also plate 11. When a coin has been passed into either of the slots and has been engaged by lever 24 and hook 23 and the ejector moved rearwardly a short distance plates 54 and 55 move down upon their respective pivots 56 and 57 and close both of slots 10 and 32. Both slots are closed even though the coin has only passed into one slot. This is arranged in this manner so that a second coin can not be placed in the machine while the first coin is operating the mechanism thereof. In order to cause these plates 54 and 55 to move across the slots 10 and 32 springs 58 and 59 are adapted to engage arms 60 and 61 projecting from the plates, and normally press against the same in such a direction so as to give the respective plates a tendency at all times to close the respective slots. Springs 58 and 59 are journaled upon bars 62 and 63 that in turn are mounted in suitable ears turned up or formed from plate 13'. The opposite ends of springs 58 and 59 to that which engages the arm extending from plates 54 and 55 engage by rocking members 12 and 13. The rocking members 12 and 13 are loosely journaled upon bars 62 and 63 but are rigidly secured to cross bars 64 and 65 which in turn are loosely journaled on bars 62 and 63. By this construction whenever the rocking members 12 and 13 are moved the same will press upon the ends of springs 58 and 59, and will also release plates 54 and 55 for permitting the respective springs to close their respective slots, the respective rocking members 12 and 13 having a projection that normally rests beneath plates 54 and 55 and bears against the same so as to leave the respective slots 10 and 32 open. When the rocking members 12 and 13 are moved the ends that project beneath the respective plates are moved for permitting the free action of plates 54 and 55 for causing the respective springs to act upon the respective plates for causing the same to close their respective slots 10 and 32. The rocking members 12 and 13 are provided with arms 66 and 67 that are adapted to engage reciprocating cam members 68 and 69. The respective cams 68 and 69 are provided with raised portions 70—70 that cause the movement of arms 66 and 67 upon the reciprocation of the respective cams, the respective arms resting against the cam at its lowest point when the mechanism is in its normal position. After a coin has been placed in the device and plunger 26 forced in a short distance the respective cams 68 and 69 which are rigidly secured to frame 20' move back therewith, and consequently permit the raised portions 70—70 of the respective cams to move arms 66 and 67 for rocking members 12 and 13. By this construction it will be observed as the plunger begins its movement the respective plates 54 and 55 begin to move downward across slots 10 and 32, and will remain across said slots for closing the same until the plunger has come back to its normal position.

Secured to the cross bars 64 and 65 are magnets 71 and 72 that extend downwardly therefrom to a point in the rear of where the respective coins stop after the same have been placed in slots 10 and 32 and before plunger 26 has been moved. Plate 19 is apertured at these points, and the apertures are countersunk or beveled off from the side opposite the coin, so as to permit the respective magnets to contact with the coins as the same take their place preparatory to the operation of plunger 26. If the coin contains any magnetic material, as iron or steel, the magnet will hold the coin in place until hook 23 and arm 24 have moved a short distance from plate 19 and will then release the coin. By the time the coin is released the notched out portion 73 in arm 24 and hook 23 has moved away sufficiently from plate 19 to permit the coin to drop down into the bottom part of the machine and will consequently not operate the ejectors. In order to hold the magnets in their proper position springs 74 and 75 are mounted upon bars 62 and 63 with one end engaging plates 12 and 13 and the other engaging plate 13'. This will normally hold arms 66 and 67 against the beveled portions 70—70 and also the respective magnets so that the lower end will be in a position for magnetizing any coin having magnetic material therein.

It will be observed that arms 24 are normally held elevated by means of a spring 76 which is mounted upon the inner end of plunger 26 and as the respective ends of the spring engage the respective arms 24 of the ejecting members 7 and 8.

Figure 6:
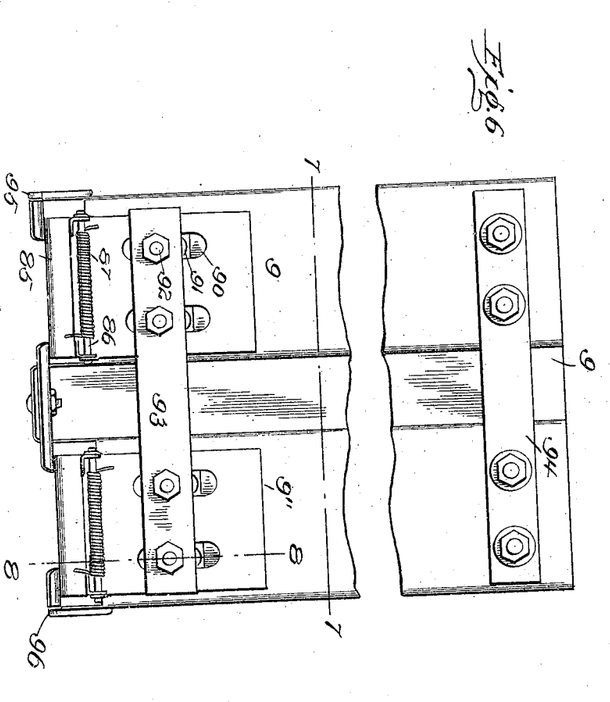
Fig. 6 is a rear elevation of a pair of chutes for containing matter to be vended, together with means for causing the proper vending of matter contained therein.
Figure 7:
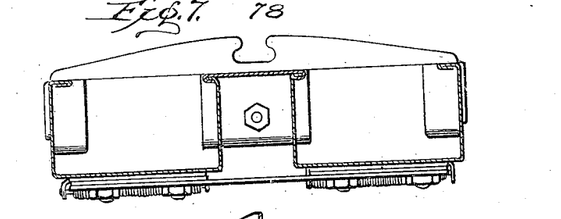
Fig. 7 is a section through Fig. 6 on line 7—7.
Figure 8:
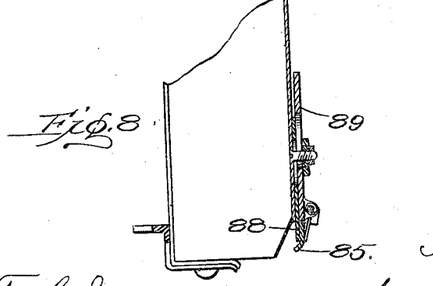
Fig. 8 is a detail fragmentary sectional view approximately on line 8—8 of Fig. 6.
Figure 9:
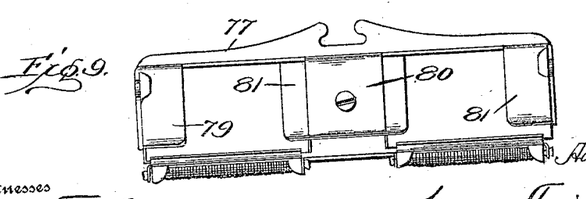
Fig 9 is a bottom plan view of the structure shown in Fig. 6.
Figure 10:
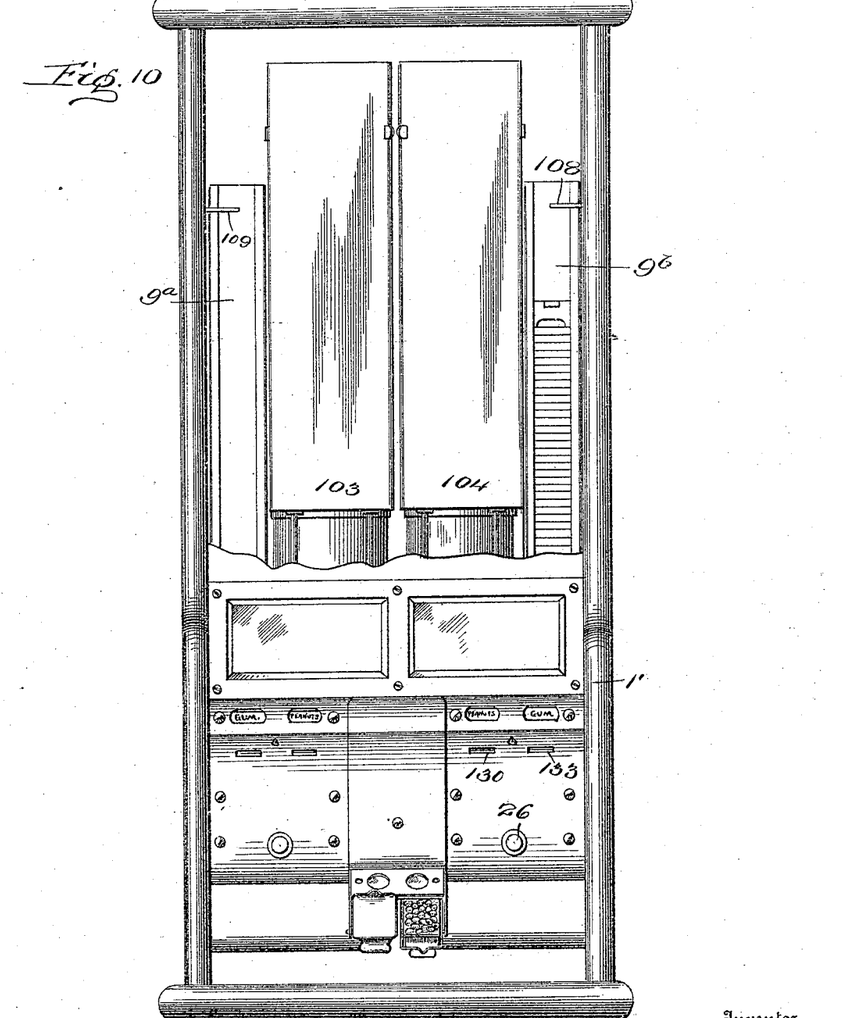
Fig. 10 is a front elevation, certain parts being broken away, of a slightly modified form of my invention showing means for vending packages of predetermined size and material in bulk.
Figure 12:
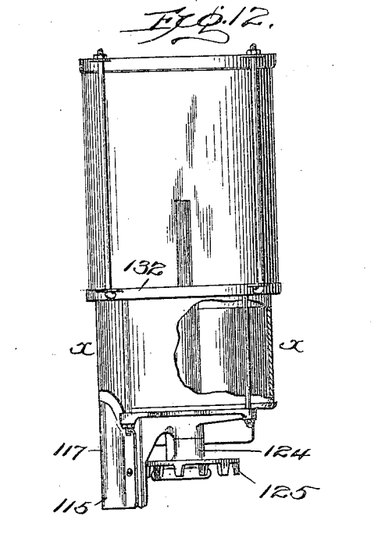
Fig. 12 is a detail view of a chamber and receptacle for containing material in bulk.
Figure 13:
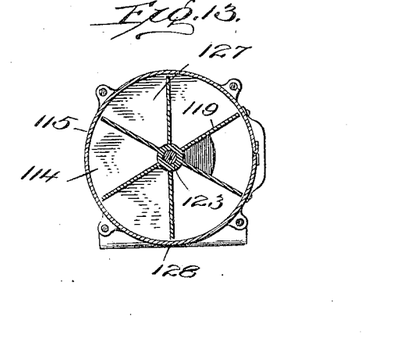
Fig. 13 is a section through Fig. 12 on line 13—13.

Mounted upon the respective frames 2 and 3 are a plurality of pairs of magazines 9 which are identical, and therefore the description of one pair will be sufficient to disclose the structure of the other. The pair of magazines 9 are divided into chutes or magazines proper 9' and 9" (Fig. 6). The magazines 9' and 9" are provided with a base plate 77 that is formed with a guiding notched out portion or pair of grooves 78 which engages a guiding bar 79 that is rigidly secured to the frame 2. The base plate 77 is formed with overlapping members 79, 80 and 81, the overlapping members 79 and 81 forming supports for the matter in the magazines while member 80 holds in position a supporting plate 82 that projects a short distance beyond the sides of each of the magazines 9' and 9" so as to act with the respective supports 79 and 81 in supporting the articles to be vended. All of the supporting members are curved downward at their outer edge to permit the free removal of the article to be vended when any of the extensions 38 are forced through the respective magazines. In order to accommodate the respective extensions 38 the base plate 77 is cut out at 83 and 84 so as to permit the free passage of the extension as clearly seen in Fig. 2.

As the package to be vended is forced from the respective magazines the same forces back the pivotally mounted or hinged plate 85 which is journaled upon a shaft 86 and is normally held across the rear opening of the magazine by a spring 87. This pivotally mounted plate is adapted to prevent the accidental removal of the article to be vended but does not interfere with the positive removal of the various articles when the mechanism is properly operated. However, in order to regulate the size of the article to be vended a plate 88 is positioned between a plate 89 that carries the pivotally mounted plate 85 and the rear wall of the magazine. By reason of elongated slots 90 and 91 in plates 89 and 88 respectively plate 88 may be adjusted for permitting articles of various thickness to be vended from the magazine. The plates 88 and 89 are held in place by suitable bolts 92 that also hold in place a cross bar 93. The cross bar 93 is adapted to not only hold these plates in position but to rigidly hold the lower ends of the magazine in position. The upper ends of the magazine are held in position by cross bar 94 as clearly seen in Fig. 6.

Figure 3:
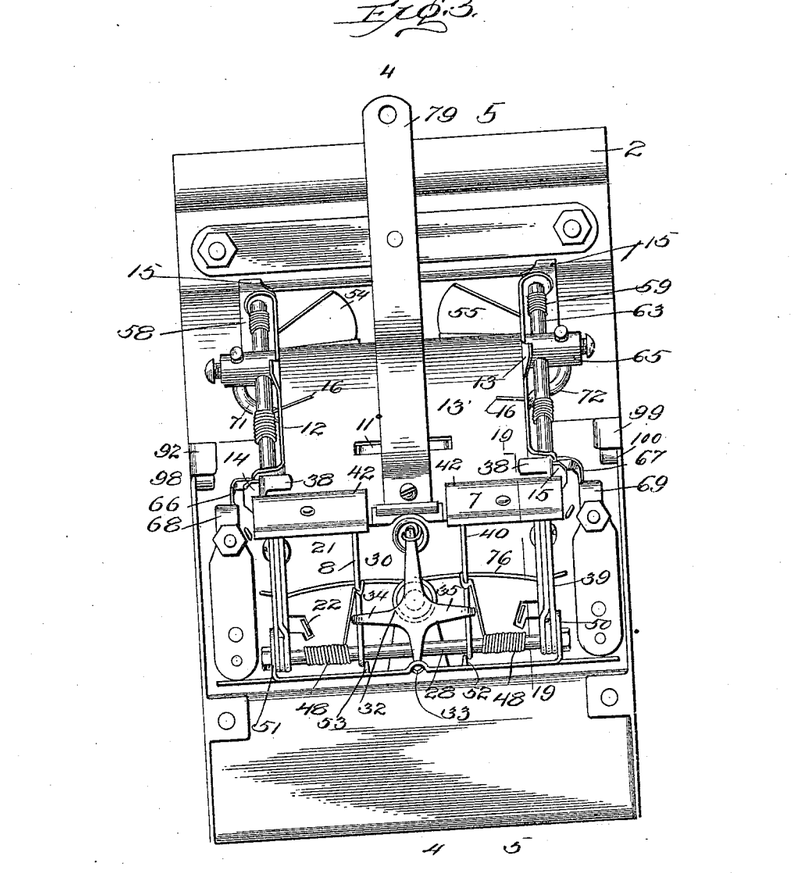
Fig. 3 is a rear elevation of the operating mechanism used in ejecting material to be vended.

In assembling the magazines with the mechanism shown in Fig. 3 the notched out portion 78 is slipped over plate 79 and lugs 95 and 96 pass on the inside of the side plates of frame 2 and between lugs 97 and to the preferred construction for forcing the lowermost pieces of merchandise in the chute out into deflector 31 ready to be taken up by the purchaser. While the ejector beneath chute 9ᵇ is ejecting merchandise from chute 9 the ejector positioned beneath magazine 104 will move downward to the rear but will not operate wheel 124.

Chute 120 is preferably formed double so that merchandise in bulk may be separately vended from magazine 103 and 104 and also so that the respective merchandise will not be mixed during the vending thereof. A plate 134 is bolted or otherwise rigidly secured to chute 120 and is formed with a hook shaped extension 135 that is adapted to engage a cross bar 136. This will positively hold the lower end of the chute in position the upper end being positively held in position by being positioned upon the cross bar 135 and then engaged by the lower end of a removable front piece 4. The front piece 4 is formed with depending portions that project through apertures in bar 136 so that after the front piece 4 has been placed in position the same cannot be removed at its lower end. In order to prevent the removal at its upper end a suitable lock 139 is provided. By this construction and arrangement whenever it is desired to remove any of the parts of the mechanism lock 139 is operated and then front plate 4 is removed. This will permit the removal of the remaining parts as may be desired.

What I claim is:

1. In a vending machine, a slidable carriage, a plunger for operating said carriage, an ejector carried by said carriage, a coin grip, a ratchet arm connected with said ejector and adapted to normally prevent the return of said ejector, and means for moving said ratchet arm to an inoperative position for permitting the return of said carriage and said ejector.

2. In a vending machine, an ejector, a carriage therefor, means for moving said carriage, a ratchet arm connected with said ejector and adapted to normally prevent the return of said ejector, and said carriage, and a rockable lever for moving said ratchet arm to an inoperative position for permitting the return of said carriage and said ejector, said rocking lever being formed with a cam shaped end for unlocking the lever when the same has moved to its extreme outer position.

3. In a vending machine, an ejector, a carriage therefor, a hook on said carriage for engaging a coin, a rockable lever for engaging said coin for assisting said hook in holding the same in position, means for adjustably connecting said ejector with said rockable lever, a ratchet arm for preventing the return of said ejector after the same has commenced its inward movement, and a cam on said rockable lever for causing said rockable lever to release said ratchet arm and release said coin, and means for returning said ejector after said coin has been released.

4. In a vending machine, an ejector, a carriage therefor, means for guiding a coin to a position against said carriage, means for engaging said coin and holding the same against said carriage and at the same time holding said ejector in an elevated position, a ratchet arm for preventing the return of said carriage until said ejector has ejected the article to be vended, and a cam shaped member for disengaging said ratchet arm for permitting the return of said carriage and for at the same time releasing said coin, and means for returning said carriage and said ejector when said ratchet arm has been disengaged.

5. In a vending machine, a coin slide, an ejector, a carriage therefor, a cam secured to said carriage, a rocking plate adapted to be actuated by said cam upon the reciprocation of said carriage, and a magnet connected with said rocking plate and projecting downward into proximity to the coin slide for preventing spurious coins from operating the ejector previous to the movement of said carriage, said magnet being removed by said rocking plate from proximity to said coin slide after said carriage has been moved.

6. In a vending machine, a coin slide, an ejector, a carriage for said ejector, means for moving said carriage, means for causing the coin passed through said slide to connect said carriage and said ejector, and a magnet normally in proximity to said coin slide but removed therefrom when said ejector has been moved for delivering an article.

7. In a vending machine, an ejector, a coin slide for permitting the insertion of a coin, said coin slide being formed of a stationary plate having a slide-way on each side thereof and a pair of rockable plates formed with slide-ways therein that act in conjunction with the slide ways on said stationary plate, and means connecting said ejector and said rockable plates for causing the slide-ways in said rockable plates to move away from the slide-ways formed in said stationary plates.

8. In a vending machine, an ejector, a coin slide for permitting the insertion of a coin, said slide being formed of spaced ways, means for rocking one of said ways for ejecting any foreign matter forced therein, and means connecting said ejector and said rockable way for causing movement of said rockable way when said ejector is moved.

9. In a vending machine, an ejector, a coin slide for permitting the insertion of a coin, said slide being formed of a stationary way and a rockable way, means for rocking said rockable way for dumping for- 98 and 99 and 100. This will positively hold the magazines in proper relation to the extensions 38 and to the various ejectors connected therewith so that upon the insertion of a coin the proper ejector will be operated for ejecting the proper kind of merchandise.

It will be noted that the magazines 9' and 9'' are spaced a short distance apart but if desired the same may be made larger or only one of the same may be made larger and yet the same ejecting mechanism used for ejecting merchandise therefrom.

In some vending machines it is desirable to vend articles of a predetermined size and also from the same machine vend merchandise in bulk. In order to accommodate this kind of trade I have arranged to use the mechanism shown in Figs. 3, 4 and 5 with simply the addition of an arm or striking member 101 to operate the mechanism for dispensing or vending merchandise in bulk, the remaining mechanism and ejector operating in the usual manner.

Figures 14, 15:
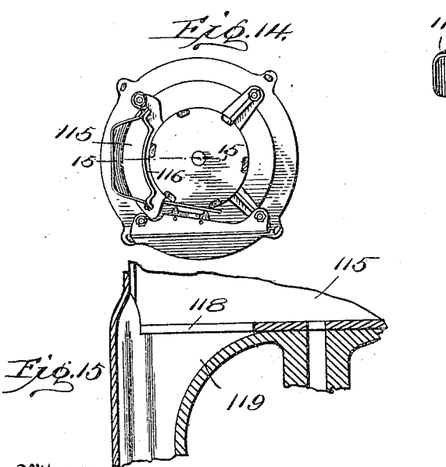
Fig. 14 is a bottom plan view of the structure shown in Fig. 12.
Fig. 15 is a fragmentary sectional view approximately on line 15—15 of Fig. 14.
Figure 16:
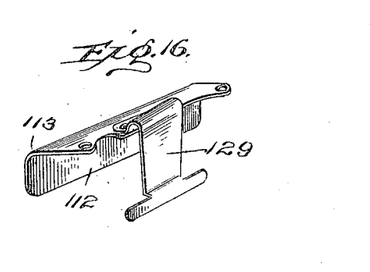
Fig. 16 is a detail fragmentary view of a spring and support therefor used in connection with the mechanism shown in Fig. 12 for causing the material therein to be vended therefrom in successive steps.
Figures 17, 18, 19, 20, 21:
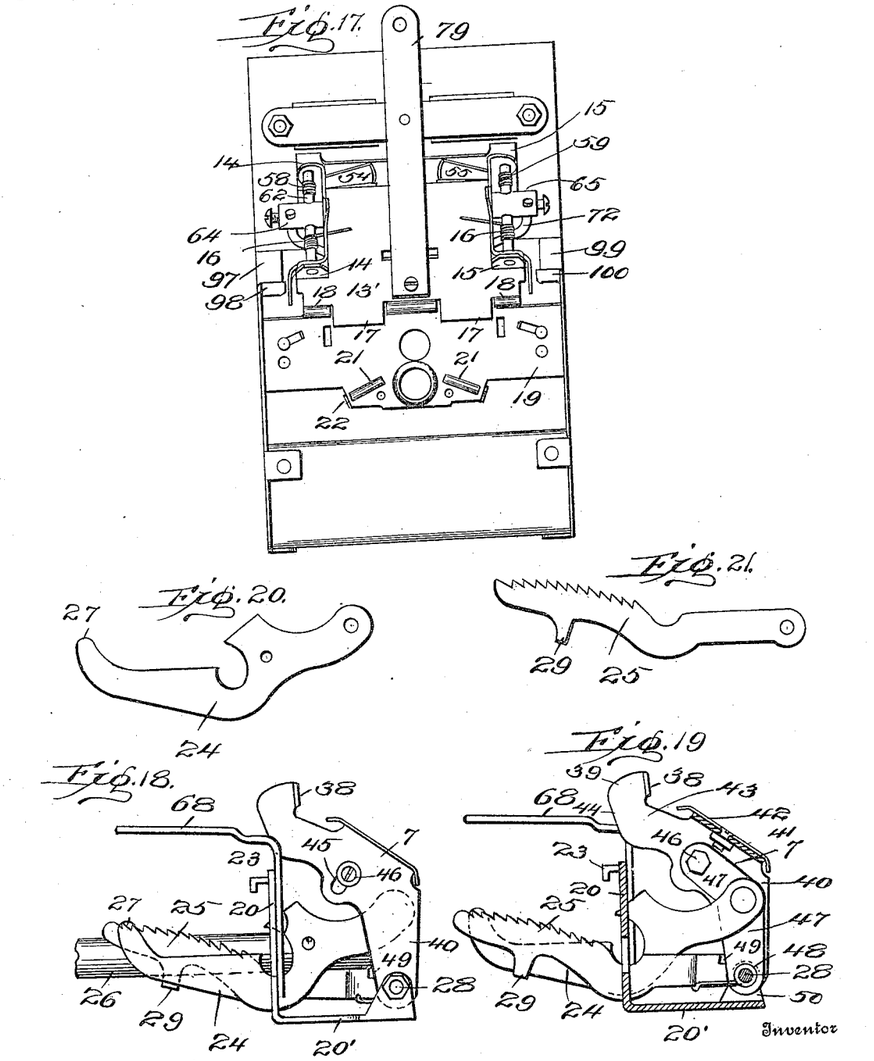
Fig. 17 is a rear view of the structure shown in Fig. 3 with the ejectors and carriage therefor removed.
Fig. 18 is a side elevation of an ejector and carriage removed.
Fig. 19 is a section through the ejector and carriage approximately on line 19—19 of Fig. 3.
Fig. 20 is a side view of a lifting lever.
Fig. 21 is a side view of a ratchet arm.
Figure 22:
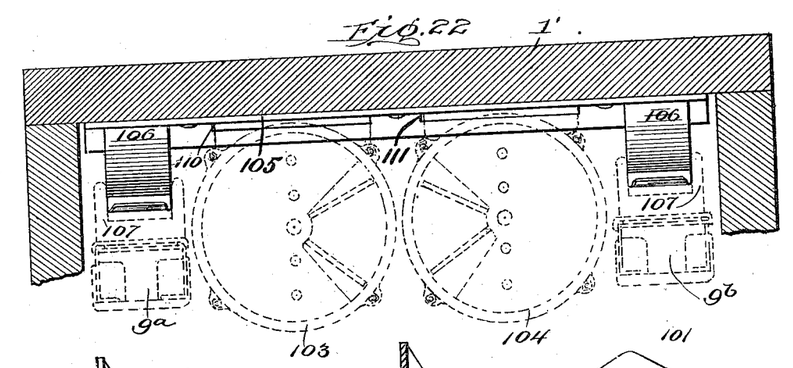
Fig. 22 is a horizontal section through Fig. 10 showing the chute magazines for holding merchandise to be vended in dotted lines.
Figure 23:
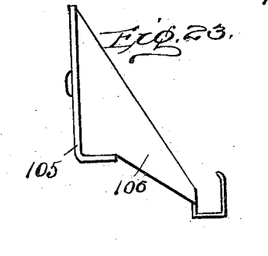
Fig. 23 is a side elevation of a support, in supporting the magazines shown in Figs. 10 and 22.
Figures 24, 25:
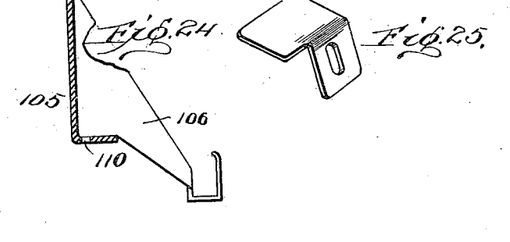
Fig. 24 is a section through the support shown in Fig. 23.
Fig. 25 is a detailed perspective view of a blade used on the ejectors for guiding the merchandise when ejected.
Figure 26:
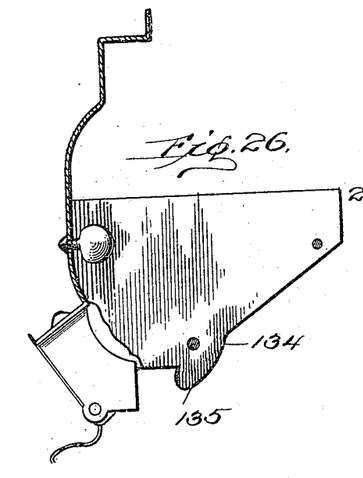
Fig. 26 is a section through Fig. 27 on line 26, 26.
Figure 27:
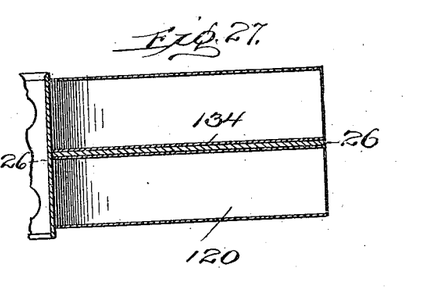
Fig. 27 is a fragmentary horizontal sectional view through the chutes shown in Figs. 10 and 26.

In the modification in which merchandise in bulk is vended a housing 1' similar to housing 1 is used and magazines 9ª and 9ᵇ are used similar to 9' and 9'' but arranged as a simple magazine instead of being connected together in pairs. In order to support the magazines 9ª and 9ᵇ and magazines 103 and 104 a bracket 105 is rigidly secured to the housing 1' which supports the respective magazines in their proper position. Auxiliary brackets 106—106 are secured to bracket 105 and are adapted to be engaged by brackets 107—107 on the respective magazines 9ª and 9ᵇ. By this arrangement brackets 107—107 are simply hooked over the outer ends of brackets 106—106 which will properly support the magazines 9ª and 9ᵇ. The upper ends of the magazines may simply rest against the housing 1' if desired, but usually I provide guiding pins 108 and 109 for properly holding the same in a substantially vertical position. Formed in brackets 105 are slots 110 and 111 into one of which is fitted a depending flange 112 from a bracket 113. Bracket 113 is rigidly secured to a spider 114 upon which hopper 115 is mounted. Hopper 115 is connected with magazine 104 so as to feed merchandise from magazine 104 to the hopper for proper vending. Magazine 103 is provided with a hopper and various other mechanism similar to the magazine 104 and associated mechanism so that the description of magazine 104 and associated mechanism will clearly apply to magazine 103. Spider 114 is provided with a chute 115' that is formed from an extension 116 cast integral with the spider and a plate 117 preferably made from sheet metal that contacts with the hopper 115 a short distance above an aperture 118 formed therein. The cast portion 116 of chute 115' is beveled at 119 so as to permit the free feeding of merchandise from hopper 115 through the chute 115' to a chute 120 that is provided with a door 121 which in turn is normally closed by a spring 122. Pivotally mounted upon a shaft 123 is a wheel 124 formed with a plurality of projecting lugs 125 that are adapted to be engaged by arm 101 when the ejecting member carrying arm 101 is being held elevated by a coin. As the plunger 26 is forced inward arm 101 engages one of the lugs 125 and partially rotates wheel 124, and consequently moves shaft 123 sufficiently far to cause one of the pockets 127 to move above opening 118. Pockets 127 are formed by blades 128 and by the sides of hopper 115. The wheel 124 moves only a short distance and as shown in the drawings only one-sixth of a revolution on each outward movement of arm 101, and is then held rigidly against movement by spring 109 which is rigidly secured to bracket 113, the lower end of the spring engaging two of the lugs as clearly seen in Fig. 14.

When it is desired to purchase some of the merchandise as contained in magazine 104 a proper size coin is placed in slot 130 and plunger 26 is forced inward. This will operate the mechanism for causing both of the ejecting members connected with the plunger to move outward but will only cause the ejecting member beneath magazine 104 to remain in an elevated position. As the plunger moves outward the ejecting member beneath magazine 9ᵇ will move downward and pass beneath the same without ejecting any merchandise therefrom, but the ejecting member below magazine 104 will move straight out and arm 101 will strike one of the lugs 125 and move the same sufficiently far to cause a new pocket 127 to come above opening 118, the respective pockets 127 having been previously filled with merchandise contained in magazine 104 by the passage downward of the same through aperture 131. It will be observed in this connection that the respective plates 128 do not extend entirely to the dividing plate 132 that contains aperture 131, but falls short thereof in order not to permit the clogging of any of the merchandise between any of the blades and plate 132. The pockets 127 being full, with the exception of one directly above opening 118, it will be evident that when shaft 123 is rotated as for instance a one-sixth of a turn a new pocket will be brought above opening 118 and all the merchandise contained therein will pass through chute 115' into chute 120 and will be in a position to be removed by the purchaser upon simply opening door 121. If some of the merchandise in magazine 9ᵇ should be desired a coin is placed in slot 133 and then plunger 26 is operated. This will cause an ejector to be operated similar eign matter from said slide, a plate connected to said rockable way and adapted to move across the entrance of said slide on the rocking of said rockable way, and means connecting said ejector and said rockable way whereby said rockable way will be rocked upon the operation of said ejector.

10. In a vending machine, an ejector, a coin slide for permitting the insertion of a coin, said slide being formed of a stationary way and a rockable way, means connecting said rockable way and said ejector whereby upon the movement of said ejector said rockable way will be rocked, and a magnet secured to said rockable way and having one end in proximity to the coin after the same has been inserted into the slide, whereby a slug of magnetic material will be held against operating said ejector.

11. In a vending machine, an ejector, means upon said ejector for engaging a coin for causing said ejector to operate, a slide for guiding a coin to said ejector, and guides for guiding said coin from the coin slide to the ejector which are of a size sufficient to guide only a substantially perfect coin.

12. In a vending machine, an ejector, a coin slide, a coin seat for receiving a coin from said coin slide, a guiding member for guiding a perfect coin to said coin seat but permitting a coin of less than the correct thickness to pass by said coin seat, and means on said ejector for engaging said coin after the same has reached its seat, and means for operating said ejector.

13. In a vending machine, an ejector, a coin slide, a coin seat for receiving a coin from said coin slide, means on said ejector for engaging said coin including a pointed member that presses against one side of said coin for holding the coin in proper position, and means for operating said ejector, said pointed member being arranged to press against said coin and hold the same in position for permitting the operation of said ejector for causing the rejection of slugs with a hollow center and slugs of yielding material.

In testimony whereof I affix my signature in presence of two witnesses.

ADOLPH RYDQUIST.

Witnesses:
THOS. A. RYAN,
MARIE N. BURKE.